Nov. 2, 1965

A. L. HERRMANN 3,215,968

PRINTED CIRCUIT BOARD CONNECTOR

Filed Dec. 21, 1960

2 Sheets-Sheet 1

Adolf L. Herrmann,
*INVENTOR.*

BY S. J. Rotondi
A. P. Dupont
H. P. Murphy

Nov. 2, 1965 A. L. HERRMANN 3,215,968

PRINTED CIRCUIT BOARD CONNECTOR

Filed Dec. 21, 1960 2 Sheets-Sheet 2

Adolf L. Herrmann,
*INVENTOR.*

*BY* S. J. Rotondi
A. P. Dupont
W. L. Murphy

United States Patent Office 3,215,968
Patented Nov. 2, 1965

3,215,968
PRINTED CIRCUIT BOARD CONNECTOR

Adolf L. Herrmann, 1206 Locust Ave. SE., Huntsville, Ala.

Filed Dec. 21, 1960, Ser. No. 77,477
10 Claims. (Cl. 339—17)
(Granted under Title 35, U.S. Code (1952), sec. 266)

The invention described herein may be manufactured and used by or for the Government for governmental purposes without the payment of any royalty thereon.

My invention relates to printed circuit boards provided with pluralities of terminals disposed in corresponding pairs and more particularly, to connectors for releasably joining the boards of an adjacent pair of the boards and electrically connecting the corresponding pairs of the terminals.

Conventional printed circuits include boards in which component parts of electronic equipment are compactly mounted thereon and connected in subassemblies for quick and ready replacement. The subassemblies are connected to terminals correspondingly spaced on edges of the boards and the boards are secured with the edges disposed in a butting relation for respective electrical connection of pairs of the terminals.

In the conventional circuits, bayonet connections are disposed between the corresponding pairs of the terminals and the bayonet joints are individually soldered to secure electrical connection thereof. The terminal joints are much smaller and more closely spaced than the usual joints of component electrical terminals and the difficulty of soldering and resoldering the bayonet joints with available equipment markedly impairs the effectiveness of the construction. The joints must be resoldered each time a board is replaced.

An object of my invention therefore, is to provide removable connectors for such boards.

Another object of my invention is to provide such a connector disposed to be removably secured to the adjacent boards for engagement between the corresponding terminal pairs to provide electrical continuity therebetween Other aims and objects of my invention will appear from the following explanation.

In carrying out my invention, a connector is provided with contacts corresponding to the terminal pairs and a block disposed for respective removable attachment to a pair of printed boards, intermediate the ends of at least one of the boards, and moulded to receive the contacts. The contacts are disposed to grip the block and respectively provided with resilient arms disposed to extend from the block for engagement with the terminals of a pair thereof for electrical continuity therebetween.

Figures 1, 2, 3:
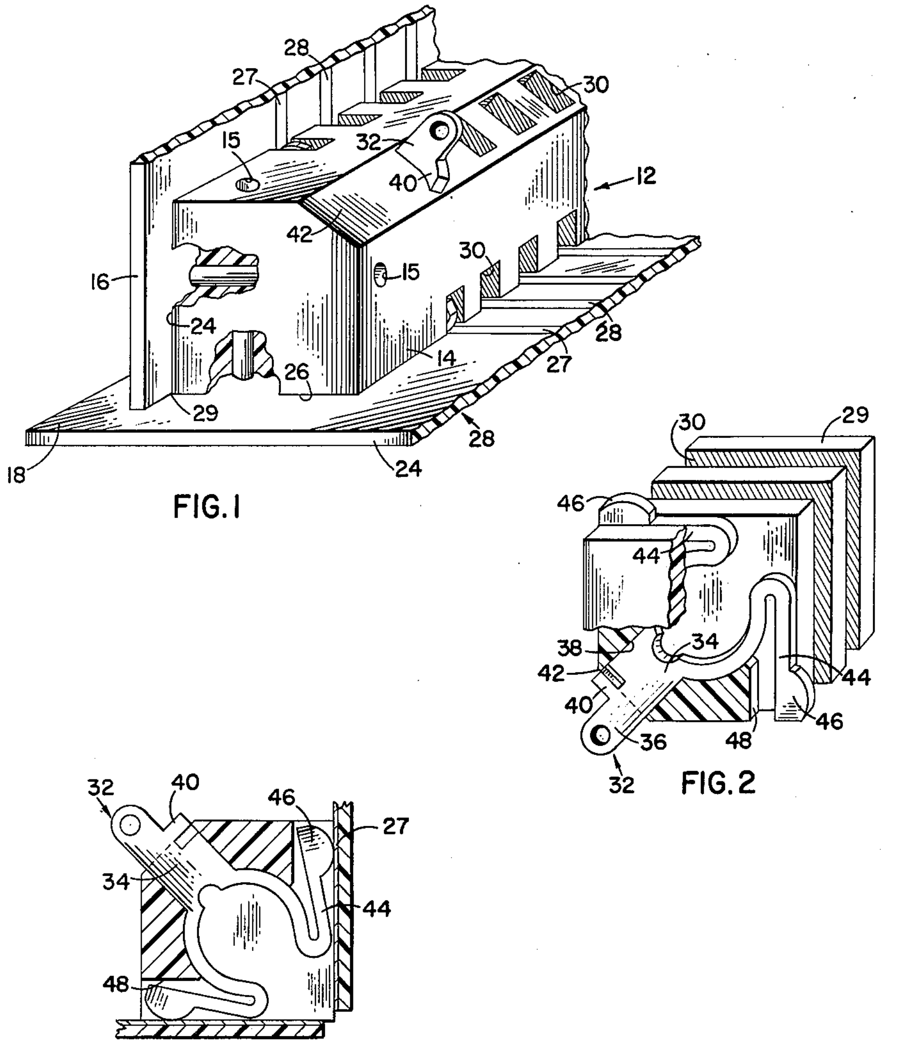
Figure 5:
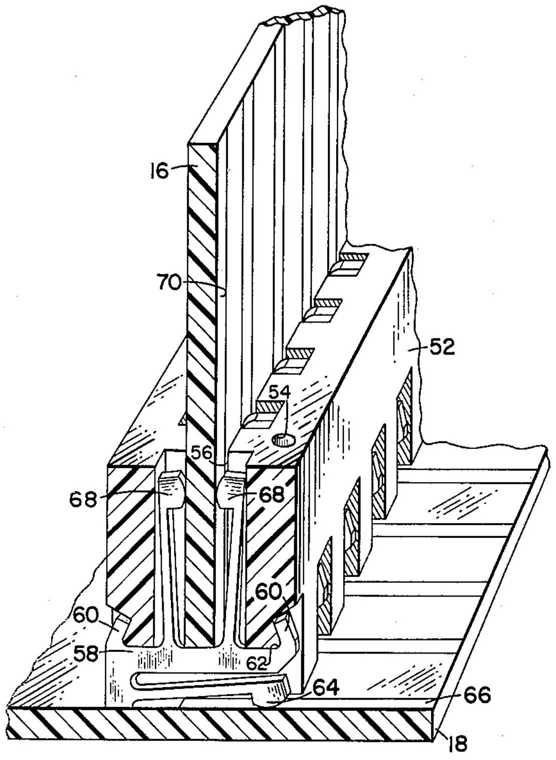
Figure 4:
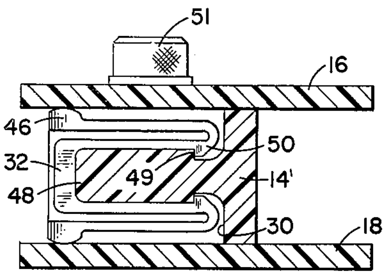

For more complete understanding, reference is directed to the following description and accompanying drawing, in which, FIGURE 1 is a partly cut away perspective view of a connector secured between a pair of printed circuit boards; and FIGURE 2 is a perspective view of the connector of FIGURE 1 rotated 180° and partly cut away to show a contact therein; and FIGURE 3 is a section of the block of FIGURE 2 with the contact in engagement with a corresponding pair of terminals; and FIGURE 4 shows a pair of printed circuit boards with terminals thereof in spaced relation; and FIGURE 5 shows a modification in which a connector is removably secured to one printed circuit board and disposed to grip an adjacent board.

Accordingly, a connector 12 includes a block 14 of insulating material having holes 15 for bolted or similar attachment to boards 16 and 18. A pair of planar faces 24 and 26 of block 14 intersect along a line coincident with one edge of the block and the faces are disposed to engage the respective boards in the attachment to secure the boards in predetermined angular relation.

Boards 16 and 18 include corresponding pairs of terminals such as 27 and 28 similarly spaced on adjacent joint 29 of the boards, and connector 12 is provided with apertures 30 which form a contact receptacle to enclose contacts 32 respectively corresponding to the terminal pairs.

Aperture 30 includes a portion 38 extending through block 14 and each of the contacts includes a body 34 with a lug 36 disposed thereon to project through portion 38. A tab 40 is provided on lug 36 and disposed to bend for engagement with an inclined surface 42 disposed normal to portion 38 to retain contact 32 within block 14. A pair of arms 44 is secured to the respective ends of body 34 and respectively provided with tips 46 extending from block 12 to resiliently engage the terminals of the corresponding pair thereof when block 12 is secured to the boards.

Body 34 and arms 44 are resilient to maintain pressure contact of tips 46 with the corresponding terminals responsive to engagement of the faces with the boards. Arms 44 are displaced into portions 48 of apertures 30 responsive to the engagement. As shown in FIGURES 1, 4 and 5, tips 46 engage points of terminals 27 of boards 18 intermediate the ends thereof.

In the embodiment of FIGURE 4, block 14′ secured between spaced printed circuit boards is provided with sections 48 respectively projecting within apertures 30 and having opposing ledges 49. Contacts 32 are provided with bifurcated portions each including a U-shaped reverse bent portion. The contacts are provided with spurs 50 disposed for respective engagement with ledges 49 to secure the contact to the block. A bolt 51 is provided with a knurled head and disposed to secure together block 14′ and panels 16 and 18.

In the embodiment shown in FIGURE 5, a block 52 is provided with a hole 54 for bolted attachment to board 18, and a groove 56 to receive board 16. A contact 58 is provided with tabs 60 to grip opposed projections 62 and secure the contact to block 52. Contact 58 is provided with a single tip 64 for electrical contact with terminal 66 of board 18, and a pair of tips 68 resiliently disposed to grip board 16 therebetween and provide electrical contact with corresponding terminal 70 of board 16.

While the foregoing is a description of the preferred embodiment, the following claims are intended to include those modifications and variations that are within the spirit and scope of my invention.

I claim:

1. A circuit board connector comprising an elongated body of insulating material, said body having a pair of planar faces intersecting at a line along the length thereof and a plurality of spaced slots each extending across said faces, contacts disposed in said slots and each provided with a body portion extending through an aperture in said body, means provided on said body portion to secure the contact therein, resilient arms provided on said contacts and provided with tips normally extending beyond said faces, and means adjacent each said faces for securing a circuit board thereto.

2. A printed circuit board connector for electrically connecting correspondingly spaced conductors of a pair of printed boards comprising: a body of insulating material having a plurality of faces respectively disposed for engagement with said boards and having a plurality of slots extending transversely across said body in communication with each of said faces meeting at a junction therebetween; a bifurcated spring contact element in each of said slots, the bifurcated portions having a contact portion at the ends thereof, said contact portion normally extending beyond said faces for engagement with corresponding conductors of said boards for electrical connection of said conductors of each of said boards; detent means securing said elements in said slots in a manner for said contact portions to be depressable thereinto by contact with said boards; and, means for securing said insulating body to said boards intermediate the ends of at least one of said boards.

3. A printed circuit board connector for electrically connecting correspondingly spaced conductors of a pair of printed boards comprising: a body of insulating material having a plurality of faces respectively disposed for engagement with said boards and having a plurality of slots extending transversely across said body in communication with each of said faces; a spring-urged contact element in each of said slots, said contact elements provided with contact portions normally extending beyond said faces for engagement with corresponding conductors of said boards for electrical connection of said conductors of each of said boards, said body further provided with a plurality of apertures each disposed in communication with respective ones of said slots and transversing said body, said contacts having a stem portion disposed in each of said apertures and a tab on each of said stem portions for bending to engage said body for securing said contacts therein.

4. A printed circuit connector for electrically connecting correspondingly spaced conductors of a pair of printed boards comprising: a body of insulating material having a pair of planar faces intersecting at right angles along the edge of said body to receive said boards thereagainst in normal relation, and a plurality of slots extending transversely across said body in communication with each of said faces; a resilient contact disposed in said slots at each position of intersection with corresponding conductors of said boards, said contact including a pair of reverse-bent portions, each of said reverse-bent portions having a contact portion at the ends thereof, said contact portion normally extending beyond each of said faces for engagement with said corresponding conductors at each position of interconnection.

5. A solderless connector for interconnecting corresponding contact strips of a plurality of printed circuit board faces, comprising: an insulating body having a plurality of planar faces for receiving thereagainst said circuit board faces; a plurality of transverse slots in each said body face for aligned engagement with said strip; a metallic contact member disposed in each of a plurality of slots of each said face and extending into a corresponding slot of said other face providing means to interconnect said corresponding contact strips; a contact portion formed at each lateral end of each contact member being resiliently supported to extend through said faces into contact with circuit boards held on said faces, said contact portions being depressable into said slots responsive to contact with said circuit boards; detent means on each said member for engagement with a portion of said body when said contact member is fully seated in said slots; and means for securing said body to said printed circuit board faces intermediate the ends of at least one of said boards for aligned relationship of said contact strips and said connector members.

6. A printed board connector for electrically connecting corresponding spaced conductors of a pair of printed circuit boards comprising: a body of insulating material having a plurality of planar faces for receiving thereagainst said circuit boards; a pair of said plurality of faces disposed in said body in opposed parallel relation to receive one of said pair of circuit boards therebetween; a third of said plurality of faces disposed on said body in normal relation to said pair of faces and disposed to receive the second of said pair of printed circuit boards thereagainst; said body provided wtih a plurality of slots communicating with each of said faces; a contact member mounted in each of said slots and including a contact portion extending adjacent each of said opposed faces for resilient retention therebetween of said one of said pair of circuit boards and engagement with one of said spaced conductors thereof, said contact member further including a third contact portion extending normally beyond said third of said plurality of faces for engagement with the corresponding conductor of the second of said pair of printed circuit boards.

7. A connector as in claim 6 with said contact member including a bifurcated upstanding portion and a bifurcated base portion, the arms of said upstanding bifurcated portion being supported in a recess respectively provided in each of said opposed faces and said contact portion of contact member extending normally beyond said opposed faces for retention therebetween of said one of said circuit boards; one arm of said bifurcated base portion provided with projections for engagement with said body for retention of said contact member therein, the other arm of said bifurcated base portion provided with said contact portion normally extending beyond said third of said faces for engagement with the corresponding conductor of the other of said pair of printed circuit boards.

8. A printed circuit board connector for electrically connecting correspondingly spaced conductors of a pair of printed boards comprising: a body of insulating material having a plurality of faces respectively disposed for engagement with said boards and having a plurality of slots extending transversely across said body in communication with each of said faces, said body including ledges respectively projecting into each of said slots; a bifurcated spring contact element in each of said slots, the bifurcated portion of said contact elements each including a pair of reverse-bent portions having a contact portion at the end thereof, said contact portions normally extending beyond said faces for engagement with corresponding conductors of said boards for electrical connection of said conductors of each of said boards; detent means securing said elements in said slots in a manner for said contact portions to be depressable thereinto by contact with said boards, said detent means including spurs disposed for gripped engagement with said ledges for retention of said contacts in said body, and said contact portions extending from said ledges in opposite directions for the engagement of said corresponding conductors.

9. A connector as in claim 8 wherein a pair of said plurality of said faces are disposed on said body in parallel relationship and said contact portions extend therefrom for engagement with said conductors intermediate the ends of each of said boards.

10. A printed circuit board connector for electrically connecting correspondingly spaced conductors of a pair of printed boards comprising: a body of insulating material having a pair of substantially parallel exterior faces and a third exterior face intersecting said parallel exterior faces, said body further including a pair of interior faces disposed in parallel spaced relation, a plurality of slots extending across said third exterior face and a plurality of slots extending along said interior faces in communication with said slots extending across said third exterior face; spring contact elements mounted in said slots, said contact elements each provided with a pair of bifurcated portions disposed in normal relation, the first bifurcated portion mounted in said slots extending across said third exterior face and provided with a contact portion normally extending beyond said third exterior face, the bifurcations of said second portion each mounted in one of said slots extending along said interior faces and provided with a pair of contact portions, each normally extending beyond respective ones of said interior faces.

References Cited by the Examiner

UNITED STATES PATENTS

| | | | |
|---|---|---|---|
| 2,614,944 | 10/52 | Lytle | 117—211 |
| 2,628,263 | 2/53 | Bulla | 339—151 |
| 2,694,756 | 11/54 | Warnke | 339—5 |
| 2,748,321 | 5/56 | Kamm | 339—17 X |
| 2,765,450 | 10/56 | Richardson | 339—176 |
| 2,832,942 | 4/58 | French | 339—176 |
| 2,864,977 | 12/58 | Witt et al. | 339—17 X |
| 2,942,229 | 6/60 | Berger | 339—176 |
| 2,944,121 | 7/60 | Wasylenko | 339—17 X |
| 3,026,494 | 3/62 | Andersen et al. | 339—17 |
| 3,107,319 | 10/63 | Vizzier | 339—17 X |
| 3,123,800 | 3/64 | Phelps et al. | 339—17 X |
| 3,129,990 | 4/64 | Rice et al. | 339—17 |

OTHER REFERENCES

H. H. Buggie, Electronic Components News, March 1954, pages 1 and 2.

H. R. Rosen, Amphenol Eng. News, January 1956, page 325.

JOSEPH D. SEERS, *Primary Examiner.*